March 10, 1931.  O. HELLER  1,796,100

DISTILLATION PROCESS AND APPARATUS THEREFOR

Filed March 16, 1927  2 Sheets-Sheet 1

March 10, 1931. O. HELLER 1,796,100
DISTILLATION PROCESS AND APPARATUS THEREFOR
Filed March 16, 1927  2 Sheets-Sheet 2

INVENTOR
O. Heller
by
Langner, Parry, Card & Langner Att'ys.

Patented Mar. 10, 1931

1,796,100

UNITED STATES PATENT OFFICE

OSWALD HELLER, OF WILMERSDORF, NEAR BERLIN, GERMANY, ASSIGNOR TO BAMAG-MEGUIN AKTIENGESELLSCHAFT, OF BERLIN, GERMANY, A CORPORATION OF GERMANY

DISTILLATION PROCESS AND APPARATUS THEREFOR

Application filed March 16, 1927, Serial No. 175,895, and in Germany April 1, 1926.

According to the invention, I provide a process for the distillation of solid carbonaceous material (coal, oil shale and the like) and an apparatus for carrying out this process, the said apparatus being itself an improvement over the apparatus of the same kind hitherto known inasmuch as large quantities of the material to be distilled are continually supplied to the apparatus, which latter is adapted to deal with the supply in two distilling drums which are charged and heated alternately, the products of distillation being drawn off from the apparatus in continual fashion as in the case of the supply. The distilling drums are provided with heat accumulating elements, constructed so as to present a net-like cross section, through which the material delivered therein travels and in which it is distilled by the heat accumulating elements giving up their heat to the material.

The apparatus is also so made that the furnace for heating the distilling drums is utilized for drying the material to be added to the drums.

The continuity of the supply of material and the drawing-off of the distillation products are made possible according to the invention in that, as stated, the distilling drums are charged and heated alternately, so that, at the same time as one drum is being charged and the material passing through this drum is being distilled by the heat given up by the heated refractory elements thereof, the other drum, which has already lost heat in the process of distillation, is again heated to the required temperature.

For the heating of the two drums, a common furnace is provided, which communicates with the two drums by passages which can be closed at will. These passages are closed alternately, in synchronism with the alternate interruption of the charging of one of the two drums and the closure of the outlet for the distillation products therefrom, and also in synchronism with the change-over in the supply of the heating gases to the drier.

The operation of my process will be more clearly understood from the annexed drawing, in which a constructional form is shown of a suitable plant.

Figure 1:
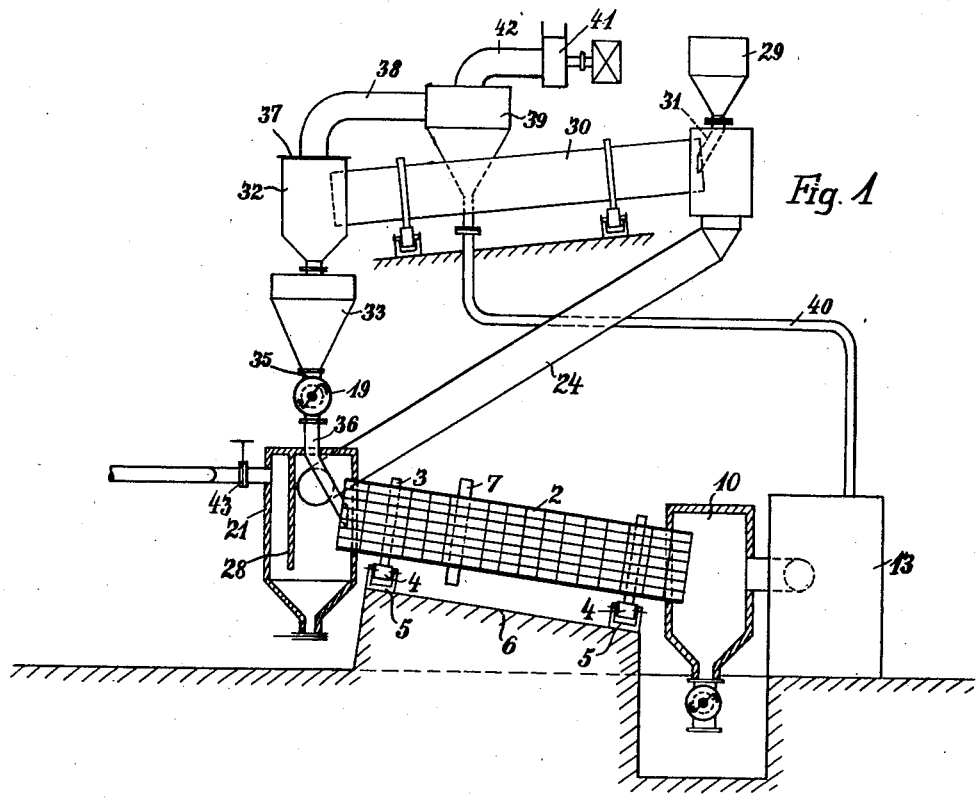
Fig. 1 is a diagrammatic view of the plant with the lower part in section.
Figure 2:
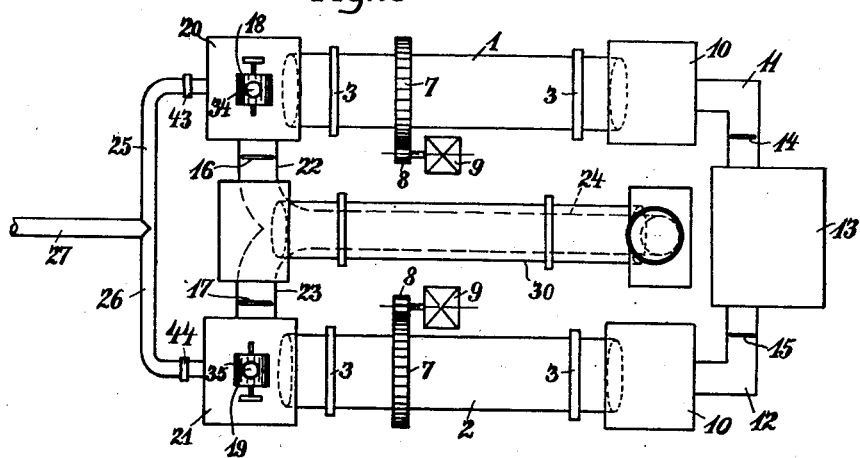
Fig. 2 is a partly sectioned plan view.
Figure 3:
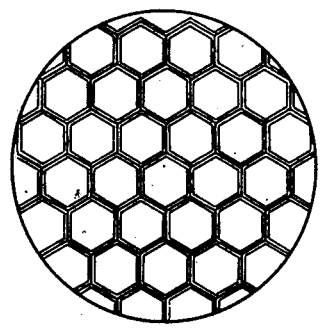
Figs. 3, 4 and 5 are views of different forms of heat accumulating elements used in the apparatus.
Figure 4:
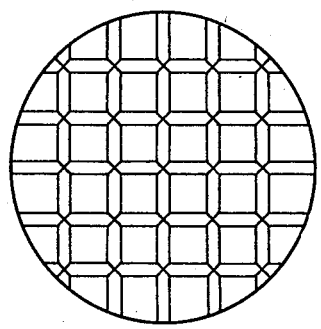
Figure 5:
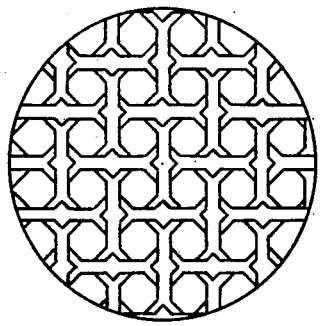

The apparatus illustrated in the drawing consists of rotatable drums 1, 2 which, in general, are arranged alongside each other and roll in known manner on rollers 4 by means of rings 3. The rollers 4 are journalled in supports 5 secured to the foundation 6. The drums 1, 2 are kept in constant rotation by means of a toothed-ring 7 which gears with the pinion 8 of a motor 9. Both drums are inclined forwards and open at their forward ends into box-shaped chambers 10, which communicate by passages 11, 12 with a furnace 13 arranged between the two drums. Each of these passages 11, 12 can be closed by a valve (e. g. a sliding damper) 14, 15. The furnace 13 is fired in any desired manner.

The drums 1, 2, at their upper end open into closed chambers 20, 21. Each of these chambers communicates by a passage 22 or 23 respectively with the upwardly inclined draw-off pipe 24 which is provided for the furnace gases. Each passage 22, 23 can be closed by a valve (e. g. a sliding damper) 16, 17.

A draw-off pipe 25, 26 for drawing off the distilled gases is provided for each chamber 20, 21 and these two pipes are united into a common pipe 27. The pipe 25 has a damper 43 and the pipe 26 has a damper 44. In addition, each chamber has a depending baffle plate 28 which extends not quite to the bottom of the chamber and serves for the removal of dust from the gas. Instead of one wall 28, several such walls or another of a different design can be used for the dust removal.

Above the rotating drums, the plant for the continued addition of material to be distilled is arranged. This material is contained in a bunker 29 of which the outlet leads into a drier 30.

The dryer 30 may be of any desired construction and in the drawing is shown as comprising a rotating drum having a slight downward inclination. The outlet 31 of the bunker 20 and the draw-off pipe 24 for the heating gases both communicate with the forward end of the drying drum. The rear end of this drum opens into an outlet box 32, the funnel-shaped bottom of which is situated over a bunker 33.

The bunker 33 has outlets 34, 35 over each of the containers 20, 21 respectively. Each of the outlets 34, 35 can be closed by a sluice gate 18, 19 or other tightly-closed charging device. Below each of these charging devices, a pipe 36 is fitted which opens into the corresponding drum 1, 2 located therebelow.

The outlet box 32 communicates by means of a pipe 38 fitted to its cover 37 with a dust separator 39 of the cyclone type, which removes the dust from the dryer 30. The dust so removed is led by a tube 40 to the furnace 13 and is burnt therein so as to assist the heating action.

The gaseous portions remaining after the dust separation are drawn from the cyclone separator 39 by a fan 41, which communicates with the separator by a pipe 42.

The operation of the plant is as follows:

The drums 1, 2 are set in rotation, the charging of the drier 30 is commenced, and one of the drums 1, 2 (e. g. the drum 1) is heated by opening the dampers 14 and 16, while keeping the other dampers 15, 17 to 19, 43 and 44 closed. In this manner, the refractory heat accumulating elements in the drum are heated and the furnace gases drawn off through the drier 30, the said gases drying the material moving forward with them. This material then passes in the dried condition into the bunker 33. When the drum 1 is sufficiently heated up, the heating gas dampers 14 and 16 are closed and outlet 43 is opened. The material to be distilled now travels through the net-like structure of the heat accumulating elements of the drum 1 from the upper to the lower end thereof, whereby the gases in the said material are driven off. These gases pass up through the drum and travel through the collecting box 20 into the draw off pipes 25, 27.

At the same time as the dampers 14 and 16 are closed, the dampers 15 and 17 are opened, so that the furnace gases thereupon flow through the drum 2, and drier 30, thereby heating the heat accumulating elements of the drum 2.

With the heating of the drums 1 and 2, the chambers 20 and 21 also become heated, and condensation of the distilled gases in these chambers is thereby prevented.

When the drum 2 is sufficiently heated up, the dampers 15 and 17 are closed and the dampers 14 and 16 are opened. At the same time, the damper 43 is closed and the damper 44 is opened, and, in addition, the sluices 18 and 19 are also closed and opened respectively. In this manner, the operation of the drums 1, 2 is again reversed.

In carrying out the process, care must be taken that a lower temperature always exists in the drying drum than is necessary for the dry distillation of the material to be distilled.

The periodic reversal of the distillation and heating in the two drums 1, 2 is thus obtained by the alternate opening and closing of the different valves 14 to 19; 43 and 44. It is immaterial in what manner the opening and closing of the valves is effected, but it is preferable to have synchronism between the movements of the valves, as required for the operation of the plant, effected automatically, for example, by electrical operating means for the valves and an electric control of this operating means, as is usual in plants of this kind.

What I claim is:

1. Apparatus for low temperature distillation of solid carbonaceous material comprising heat accumulating elements, a pair of drums adapted to contain said elements, roller means for supporting said drums rotatably in an inclined position, gearing for rotating said drums, a furnace, conduits whereby the furnace gases can be introduced into either of said rotary drums, dampers in said conduits whereby the passage of said furnace gases can be diverted from the one drum to the other drum, charging means for introducing into either of said drums the material to be distilled, dampers for said charging means whereby said material can be diverted into the drum from which the furnace gases are shut off, pipes through which the distilled gases pass from said drums, and dampers for said pipes.

2. Apparatus for low temperature distillation of solid carbonaceous material comprising a pair of drums, heat accumulating elements adapted to be grouped together in said drums so as to present a passage therethrough of reticular section, roller means for supporting said drums rotatably in an inclined position, gearing for rotating said drums, a furnace, conduits whereby the furnace gases can be introduced into either of said rotary drums, dampers in said conduits whereby the passage of said furnace gases can be diverted from the one drum to the other drum, charging means for introducing into either of said drums the material to be distilled, dampers for said charging means whereby said material can be diverted into the drum from which the furnace gases are shut off, pipes through which the distilled gases pass from said drums, and dampers for said pipes.

3. Apparatus for low temperature distillation of solid carbonaceous material comprising a pair of drums, refractory tiles adapted to be arranged within said drums so as to provide a passage therethrough of reticular section, roller means for supporting said drums rotatably in an inclined position, gearing for rotating said drums, a furnace, conduits whereby the furnace gases can be introduced into either of said drums, dampers in said conduits whereby the passage of said furnace gases can be diverted from one drum to the other drum, charging means for introducing into either of said drums the material to be distilled, dampers for said charging means whereby the passage of said material can be diverted into the drum from which the furnace gases are shut off, pipes through which the distilled gases pass from said drums, and dampers for said pipes.

4. Apparatus for low temperature distillation of solid carbonaceous material comprising heat accumulating elements, a pair of drums adapted to contain said elements, roller means for supporting said drums rotatably in an inclined position, gearing for rotating said drums, a furnace, conduits whereby the furnace gases can be introduced into either of said rotary drums, dampers in said conduits whereby the passage of said furnace gases can be diverted from the one drum to the other drum, charging means for introducing into either of said drums the material to be distilled, dampers for said charging means whereby said material can be diverted into the drum from which the furnace gases are shut off, a separate chamber for the distilled gases from each drum, a pipe connecting each said chamber with the part of one drum into which said material first enters, and valve means for each said pipe.

5. Apparatus for low temperature distillation of coal comprising heat accumulating elements, containing means in which said elements are supported, a furnace, conduits whereby the furnace gases can be passed through said elements, a drier for drying the coal prior to distillation, a separator for removing coal dust from said drier, conduits for introducing said coal dust into said furnace for firing thereof, dampers for interrupting the passage of said furnace gases to said elements, charging means for introducing coal from said drier into the said containing means, dampers for said charging means whereby coal from said drier can be diverted into the drum from which the furnace gases are shut off, a separate chamber for the distilled gases from each drum, a pipe connecting each said chamber with the part of one drum into which said material first enters and valve means for each said pipe.

6. Apparatus for low temperature distillation of solid carbonaceous material comprising a pair of drums, refractory heat accumulating elements adapted to be grouped together in said drums so as to provide a passage therethrough of reticular section, roller means for supporting said drums rotatably in an inclined position, gearing for rotating said drums, a furnace, conduits whereby the furnace gases can be passed through the refractory elements of either of said drums, a drier through which the coal to be distilled is passed, a separator for removing coal dust from said drier, conduits for introducing said coal dust into said furnace for firing thereof, dampers whereby the passage of said furnace gases can be diverted from the refractory elements of one drum to the other drum, charging means for introducing into either of said drums the coal from said drier, dampers for said charging means, means whereby the passage of said coal can be diverted into the drum from which the furnace gases are shut off, a separate chamber for the distilled gases from each drum, a pipe connecting each said chamber with the part of one drum into which said material first enters, and valve means for each said pipe.

7. In an apparatus comprising heat accumulating elements supported in an inclined rotating drum adapted to communicate with a furnace and a supply source for solid carbonaceous material to be distilled, a process of low temperature distillation of said material comprising the steps of first accumulating heat in said elements by passing through the same the furnace gases, then interrupting the passage of the said gases, and thereafter simultaneously feeding a charge of the material to be distilled through the heated elements and rolling the said material about in said elements by the rotation of the inclined drum so as to transfer heat effectively from said elements to said material.

8. In an apparatus comprising heat accumulating elements supported within an inclined rotating drum adapted to communicate with a furnace and a supply source for solid carbonaceous material to be distilled, a process of low temperature distillation of said material comprising the step of first accumulating heat in said elements by passing through the same the furnace gases, alternately with the steps of interrupting the passage of said gases, thereafter simultaneously feeding a charge of the material to be distilled through the heated elements and rolling said material about in said elements by the rotation of the inclined drum so as to transfer heat effectively from said elements to said material, and subsequently collecting separately the distillate and residue.

9. In an apparatus comprising heat accumulating elements supported in an inclined rotating drum adapted to communicate with a furnace and a dryer supplied with solid carbonaceous material to be distilled, a process of low temperature distillation of said material comprising the steps of first accumulating heat in said elements by passing through the same the furnace gases, and drying in the said dryer the material to be distilled, alternately with the steps of interrupting the passage of said gases, thereafter simultaneously feeding a charge of said material from said dryer through the heated elements, and rolling said material about in said elements by the rotation of the inclined drum so as to transfer heat effectively from said elements to said material, and separately collecting the distillate and residue.

10. In a continuously-operating distillation apparatus comprising heat accumulating elements supported in a pair of inclined rotating drums each arranged so as to communicate with a furnace and a supply source of solid carbonaceous material to be distilled, a process of low temperature distillation of said material comprising the steps of first heating the heat accumulating elements of either inclined drum by the furnace gases, then diverting the passage of said furnace gases from said drum, thereafter feeding the material to be distilled through the elements of said drum and simultaneously rolling said material about in said drum so as effectively to transfer heat from said elements to said material, finally diverting the feeding of said material from said drum, and separately collecting the distillate and residue.

11. In a continuously-operating distillation apparatus, comprising heat accumulating elements supported within a pair of inclined rotary drums each adapted to communicate with a furnace and with a dryer which is provided with a dust separator and supplied with coal to be distilled, a process of distilling the coal at low temperature comprising the steps of drying the coal by said dryer, removing coal dust from said dryer for firing said furnace, heating the heat accumulating elements of either rotary drum by the furnace gases, afterwards feeding the coal through the elements of said drum, and simultaneously rolling the coal about in said drum so as effectively to transfer heat to said coal from said elements, then diverting the passage of said furnace gases so as not to pass into said drum, and separately collecting the distillate and residue.

12. In a continuously-operating distillation apparatus comprising heat accumulating elements supported in a pair of inclined rotating drums communicating with a furnace and a supply source of solid carbonaceous material to be distilled, a process of low temperature distillation of said material comprising the steps of accumulating heat in said elements by passing through the same the furnace gases, alternately with the steps of interrupting the passage of said gases, thereafter feeding a charge of the material to be distilled through the heated elements and simultaneously rolling said material about in said drum so as effectively to transfer heat from said elements to said material, drawing off the distilled gases from the said elements in a direction opposite to the direction of feed of said material, and separately collecting the distillate and residue.

In testimony whereof I have signed my name to this specification.

OSWALD HELLER.